United States Patent [19]
Malofsky et al.

[11] Patent Number: 5,461,135
[45] Date of Patent: Oct. 24, 1995

[54] POLYISOCYANATES CONTAINING URETIDIONE AND ALLOPHANATE GROUPS, A PROCESS FOR THEIR PRODUCTION, AND THEIR USE IN ONE AND TWO COMPONENT COATING COMPOSITIONS

[75] Inventors: Adam G. Malofsky, Huntington; Stephen L. Goldstein, Cheshire, both of Conn.

[73] Assignee: Olin Corporation, Cheshire, Conn.

[21] Appl. No.: 311,691

[22] Filed: Sep. 23, 1994

[51] Int. Cl.$^6$ .................................................. C08G 18/02
[52] U.S. Cl. ......................... 528/60; 252/182.2; 540/202; 528/44; 528/45; 528/73
[58] Field of Search ........................... 252/182.2; 528/44, 528/45, 73; 540/202

[56] References Cited

U.S. PATENT DOCUMENTS 5,237,058  8/1993  Laas et al. ............................... 540/202

Primary Examiner—James J. Seidleck
Assistant Examiner—R. F. Johnson
Attorney, Agent, or Firm—Dale Lynn Carlson

[57] ABSTRACT

Disclosed herein is a liquid, monoallophanate-containing, monouretidione-containing polyisocyanate composition characterized by having (i) an isocyanate functionality of between 2.8 and 6.5, (ii) a free NCO content of 10% to 47% by weight, (iii) a viscosity of less than 1000 cp (25° C.), and (iv) the presence of monouretidione and monoallophanate groups in a molar ratio of said monouretidione groups to said monoallophanate groups of between about 20:1 and about 1:5. Also disclosed is a process for producing the above compositions, as well as their use, optionally in blocked form in one or two component coating compositions.

14 Claims, No Drawings

POLYISOCYANATES CONTAINING URETIDIONE AND ALLOPHANATE GROUPS, A PROCESS FOR THEIR PRODUCTION, AND THEIR USE IN ONE AND TWO COMPONENT COATING COMPOSITIONS

FIELD OF THE INVENTION

This invention relates generally to allophanate-containing polyisocyanates, and more specifically, to polyisocyanates which contain allophanate groups together with uretidione groups or uretidione groups with other isocyanate based functional groups. This invention also relates to a process for the production of these polyisocyanates and their use in one or two component coating compositions.

BACKGROUND OF THE INVENTION

Polyisocyanates containing isocyanurate or biuret groups are known and disclosed, for example, in U.S. Pat. Nos. 3,487,080; 3,996,223; 4,324,879; and 4,412,073. While these polyisocyanates possess many outstanding properties which make them valuable components in high performance coatings and films, the viscosity of commercially available polyisocyanates containing isocyanurate or biuret groups must be reduced in order to decrease the amount of solvent which is necessary to obtain a suitable processing viscosity. The reduced viscosity requirement for the polyisocyanates is mandated by increasingly stringent government regulations regarding the limits on the amount of volatile solvents which may be present in coating systems. While polyisocyanates that contain primarily isocyanurate groups are typically less viscous than polyisocyanates which contain primarily biuret groups, their inherent viscosities are still higher than desired. Additionally, these isocyanurate group-containing polyisocyanates do not possess sufficient compatibility with highly branched polyesters and other polyfunctional coreactant resins to permit a significant reduction in the level of solvent(s) needed to achieve a useful coating formulation viscosity. However, both biuret and isocyanurate based polyisocyanates do possess an average isocyanate functionality generally greater than 3.0, more typically above 3.5. This results in a significant degree of crosslinking during the curing of coatings made from these polyisocyanates. Such crosslinking greatly enhances the mechanical performance and chemical resistance of coating films derived from these intermediates, relative to polyisocyanates of lower functionality that provide a lesser degree of crosslinking.

A method has been proposed in U.S. Pat. No. 4,801,663 to reduce the viscosity of isocyanurate group containing polyisocyanates prepared from 1,6-hexamethylene diisocyanate (herein also referred to as "HDI"). By terminating the reaction at a very low degree of trimerization, higher levels of the monoisocyanurate of HDI are obtained and the quantity of polyisocyanates containing more than one isocyanurate ring is reduced. The higher concentrations of monoisocyanurate obtained by the method of the '663 patent, coupled with corresponding lower levels of polyisocyanurates, is said to yield a lower viscosity product. Unfortunately, the method of the '663 patent provides relatively low conversion to the desired product and results in a substantial amount of unreacted HDI starting material. This must be separated from the product, thereby increasing the production cost, which more than offsets the small benefit of the slight viscosity decrease obtained. Additionally, it has now been found by the present inventors that the isocyanurate product prepared in accordance with the '663 patent does not provide a significant improvement in coreactant or solvent compatibility.

Recent disclosures in the patent literature have proposed the allophanatization of isocyanurates with monoalcohols as a route to low viscosity, economical polyisocyanates. By way of illustration, U.S. Pat. Nos. 5,124,427, 5,208,334, 5,124,427 and 5,258,482 disclose the formation of polyisocyanate mixtures which possess an NCO content of 10 to 47% by weight and viscosities of less than 10,000 cp. Typical NCO contents are about 20% with viscosities of about 520 to 1300 cp. These references do not teach the use of polyalcohols as reactants, apparently since these polyalcohols would not be expected to yield an allophanate modified polyisocyanurate polyisocyanate with a lower viscosity than an unmodified polyisocyanurate polyisocyanate at the same level of conversion.

As with pure isocyanurate group containing polyisocyanates, the allophanate modified isocyanurate based polyisocyanates also possess an average isocyanate functionality generally greater than 3.0, most typically above 3.5, which allows for a degree of crosslinking which significantly augments the mechanical performance and chemical resistance of coating films derived from them. While this is a significant advance, it is not an optimal one for aliphatic polyisocyanates. The products of these processes tend to have a lower isocyanate functionality, at the same level of conversion, than conventional isocyanurate polyisocyanates. Higher functionalities can be realized at higher conversions, but the viscosity of the product is increased. In addition, the lowest reported viscosity was 520 cp (U.S. Pat. No. 5,124,427). Such viscosities are still too high to achieve a dramatic reduction in a coating formulation's volatile organic compound content. In fact, no quantitative mention is made about the potential or actual reductions in volatile organic compound levels achievable by employing these allophanate modified isocyanurates. It is necessary to reach viscosities well below 1000 cp, and more preferably below 400 cp, to achieve significant reductions in a coating formulation's volatile organic compound content. It would be even better still if a viscosity below 1000 cp, and more preferably below 400 cp, could be achieved while maintaining an average isocyanate functionality generally greater than 3.0, more preferably greater than 4.0.

The preparation and use of polyisocyanates with viscosities below 500 cp containing uretidione and isocyanurate groups has been previously disclosed in DE-OS 1,670,667, DE-OS 1,670,720, DE-OS 1,954,093, U.S. Pat. No. 4,614,785 and U.S. Pat. Nos. 4,994,541, 4,614,785, 4,929,724 and 4,994,541. Specifically, for example, U.S. Pat. Nos. 4,614,785 and 4,994,541 describe the production of (cyclo)aliphatic polyisocyanates containing isocyanurate groups and uretidione groups by the use of phosphine catalysts. The viscosities of the HDI derived products described were all below 200 cp. Still, improvements might be made. For example, the cycle times for the above reactions are longer than is desirable, making production costs relatively high compared to isocyanurate-based polyisocyanates. Unfortunately as well, the average isocyanate functionality of the resulting polyisocyanates containing uretidione and isocyanurate groups are generally 2.5 or less. This lower functionality results in less well crosslinked films for any given polyol resin compared to using a higher functionality polyisocyanate. Inferior mechanical properties as well as poorer chemical and environmental resistance result from employing these predominantly difunctional uretidione-containing polyisocyanates.

In other work, a high temperature, uncatalyzed process for producing substantially pure allophanates is described in U.S. Pat. No. 4,810,820. The '820 patent discloses that monols, diols, triols, or other such polyols can be heated to very high temperatures (>150° C.) with a (cyclo)aliphatic diisocyanate in the absence of a catalyst to form substantially pure allophanates. While the polyisocyanate products based on monoalcohols had low viscosities (generally less than 200 cp), their relatively low average isocyanate functionality would yield coatings with inferior properties. The described products based on diols and triols would have sufficient functionality to give high quality coatings, however those examples had very high viscosities (generally greater than 3,000 cp) and relatively low isocyanate contents (generally less than 18%). Unfortunately as well, the reaction conditions are very severe and difficult to control. A process that could be operated at a lower temperature (<130° C.) would be far more easily and safely controlled with less expensive equipment than is employed in the process of the '820 patent.

It would therefore be highly desirable if a polyisocyanate composition could be easily and safely produced by a low temperature process at a low cost to provide a product having a high average isocyanate functionality, as well as the desirable low viscosity properties of known polyisocyanates containing allophanate or uretidione groups. The present invention provides such a process and composition.

SUMMARY OF THE INVENTION

In one aspect, the present invention relates to a liquid, monoallophanate-containing, monouretidione-containing polyisocyanate composition characterized by:

i) an isocyanate functionality of between 2.8 and 6.5, ii) an NCO content of 10% to 47% by weight, iii) a viscosity of less than 1000 cp, and iv) the presence of monouretidione and monoallophanate groups in a molar ratio of said monouretidione groups to said monoallophanate groups of between about 20:1 and about 1:5, said allophanate groups being a reaction product of uretidione or isocyanate groups and a polyalcohol or a polyalcohol mixture, each molecule of said polyalcohol and said polyalcohol mixture containing between 2 and 20 carbon atoms and having a molecular weight of between 62 and about 2500, said monoallophanate-containing, monouretidione-containing polyisocyanate composition further characterized as containing: (a) no greater than 0.5% of urethane groups (as NH—CO—O) based upon the weight of the polyisocyanate composition, (b) a total amount of incorporated polyalcohol of between about 2% and about 22% (preferably between 4% and 20% based on the weight of the polyisocyanate composition, and (c) an amount of monoallophanate compounds of between about 10% and about 70% based upon the weight of the polyisocyanate composition. Preferably, the polyisocyanate composition is free of organic solvent and free of peroxide. While it is not desirable, the composition may contain a small amount of urethane, however the ratio of monoallophanate groups to urethane groups should be greater than about 5:1.

In another aspect, the present invention relates to a process for preparing the above-described polyisocyanate composition comprising the steps of:

A) catalytically dimerizing a portion of the isocyanate groups of an organic polyisocyanate, or organic polyisocyanate mixture, having aliphatic or cycloaliphatically bound isocyanate groups, to form a uretidione-containing composition, B) contacting said polyalcohol, or said polyalcohol mixture, with said uretidione-containing composition, in an amount of between about 0.01 and about 0.5 moles of alcohol groups, per mole of organic isocyanate groups in the uretidione-containing composition, upon initiation of, or during, step A) recited above, and causing said polyalcohol or said polyalcohol mixture to react with said uretidione-containing composition, thereby forming said monoallophanate-containing, monouretidione-containing polyisocyanate composition, and C) terminating the dimerization and allophanate-forming reactions, by adding a catalyst poison to the monoallophanate-containing, monouretidione-containing polyisocyanate composition, upon forming a desired amount of said monoallophanate and said monouretidione in said polyisocyanate composition.

In still another aspect, the present invention relates to coating compositions comprising an active hydrogen-containing component and the above described monoallophanate-containing, monouretidione-containing polyisocyanate composition.

In yet another aspect, the present invention relates to a method of coating a substrate which comprises contacting the substrate with a coating composition containing the above-described monoallophanate-containing, monouretidione-containing polyisocyanate composition, optionally in blocked form, as an isocyanate component in a one or two component coating composition.

These and other aspects will become apparent upon reading the following detailed description of the invention.

DETAILED DESCRIPTION OF THE INVENTION

It has now been surprisingly found that, in accordance with the present invention, polyisocyanates are provided that have an average isocyanate functionality equal to or greater than conventional polyisocyanates, while maintaining a reduced viscosity, improved solvent and isocyanate reactive resin compatibility, and a minimum level of viscosity increasing carbamate groups while still possessing the desirable properties of known polyisocyanates. It is also surprising that the polyisocyanates produced by the process of the present invention can be manufactured at reasonable costs and in a high yields.

It is particularly surprising, and in contradiction to the established art, that these objectives may be achieved, in accordance with the present invention as described hereinafter, by the incorporation of specific polyalcohols upon initiation of, or during, an isocyanate dimerization process in order to produce a polyisocyanate containing uretidione and allophanate groups.

Prior disclosures of the use of alcohols in isocyanate dimerization processes can be found in U.S. Pat. Nos. 4,614,785; 4,929,724; 4,994,541; 5,237,058; and 5,258,508. These references are directed to the trialkylphosphine catalyzed preparation of uretidione polyisocyanates wherein alcohols are used in relatively small amounts as co-catalysts and/or as additives to improve product color.

The '785 patent teaches the use of sulfonyl isocyanates to deactivate the phosphine catalyst at the end of the dimerization reaction. The addition of stoichiometric quantities of "acceptors", such as alcohols, to the recovered excess starting isocyanate is suggested as a method to scavenge any sulfonyl isocyanate that may be carried overhead with the recovered monomer. Thereby, this material may be recycled to the dimerization process without the need to use larger quantities of catalyst to compensate for any catalyst that would otherwise be deactivated by that sulfonyl isocyanate.

The '724 patent claims the addition of active hydrogen containing compounds, including alcohols, when phosphorous-nitrogen containing compounds are used to catalyze an isocyanate dimerization reaction. When used at levels of 0.1 to 1%, by weight on the starting isocyanate, these active hydrogen containing compounds are disclosed to improve reaction rates, to improve the selectivity of the catalyst to form uretidione and to improve the color of the final product. Similarly, the '058 and '508 patents suggest that alcohols, and specifically the urethane (carbamate) linkage formed by the reaction of the alcohol with the isocyanate, used at similar, low levels, will function beneficially to increase reaction rates and improve the color of the final product when trivalent phosphorous catalysts are used for the dimerization reaction.

The '541 patent claims a process for producing a low color uretidione containing polyisocyanate wherein about 0.1 to 10% by weight of the isocyanate groups in the starting charge of diisocyanate are converted to urethane groups by treatment with an alcohol prior to, or during, an organic phosphine catalyzed dimerization reaction. After terminating the reaction by the addition of a catalyst deactivating agent and removal of the excess starting diisocyanate, the color of the product is reduced by treatment with a peroxide. The product is reported to have a urethane group content (as NH— CO—O) of about 1 to 5%. Although it is not stated, it is implied that the presence of the urethane linkages somehow enhances the color reducing activity of the peroxide. No mention is made regarding the production of allophanates under the stated reaction conditions of the '541 patent. In addition, no suggestion is made therein about the addition of polyalcohols, either before, or during, the dimerization of aliphatic polyisocyanates for any purpose, much less to achieve, in a low cost process, low viscosity polyisocyanates in high ultimate conversions with functionalities typically greater than 3.0. It is therefore a surprising and unexpected aspect of the present invention that allophanate groups are indeed produced when polyalcohols are introduced into a catalyzed dimerization of aliphatic polyisocyanates. Further, the present inventors have now discovered that if the urethanization reaction is attempted during the oligomerization reaction, the alcohol preferentially reacts with uretidione to form allophanate, rather than reacting with isocyanate to form urethane groups as desired by the inventors in the '541 patent. In fact, if the urethanization reaction is carried out before oligomerization, the urethane groups formed will not convert to allophanate groups in the final product. This has the undesirable effect of increasing the viscosity of the final product while decreasing its average isocyanate functionality.

It is even more surprising and unexpected that, during the reaction carried out in accordance with the process of the present invention, no significant carbamate group formation was detected at any time during the catalyzed dimerization of the aliphatic polyisocyanates, irrespective of whether the polyalcohol is added upon initiation of, or during, the reaction. In addition, the overall maximum achievable low viscosity product yield, before the uretidione content reaches a maximum, is significantly greater than expected from the teachings of the prior art. Furthermore, the overall rate of polyisocyanate formation is significantly faster than that achieved using known processes relating to phosphine catalyzed dimerization of aliphatic polyisocyanates.

In further illustration of the unexpected nature of the present invention, European Patent Application 0,566,037 provides two examples of allophanate modified isocyanurate production using isobutyl alcohol and 1,3 butanediol as reactants. The viscosity of the isobutyl alcohol adduct was 260 cp, versus 2300 cp for the product made from the butane diol. In contrast, the working examples of the present invention provided hereinbelow demonstrate that, when employing the process of the present invention, such a dramatic disparity in viscosity is eliminated. Indeed, the current invention provides a polyisocyanate composition with excellent physical properties comparable to prior art uretidione group- and isocyanurate group-containing polyisocyanates, but also providing equivalent or higher average isocyanate functionality (e.g., functionalities preferably greater than 3.0, more preferably greater than 4.0) at a lower cost than the prior art processes, and typically having a higher maximum low viscosity conversion.

In accordance with the present invention, the term "monouretidione" means a polyisocyanate containing one uretidione group and formed from two polyisocyanate molecules, and the term "polyuretidione" means a polyisocyanate containing more than one uretidione group. The term "monoallophanate" means a poly-isocyanate formed from two polyisocyanate molecules and one alcohol group, and the term "polyallophanate" means a polyisocyanate formed from more than two polyisocyanate molecules and one alcohol group. The term "(cyclo)aliphatically bound isocyanate groups" means isocyanate groups that are bound directly to an aliphatic and/or cycloaliphatic group. The term "conversion" means that portion of the reaction mixture that is not starting polyisocyanate.

Examples of suitable diisocyanates that can be used as starting materials for preparing the polyisocyanates according to the present invention are organic diisocyanates represented by the formula

R(NCO)$_2$ wherein R represents an organic group obtained by removing the isocyanate groups from an organic diisocyanate having (cyclo)aliphatically bound isocyanate groups and a molecular weight of 112 to 1000, preferably 140 to 400. Preferred diisocyanates for the process according to this invention are those represented by the formula wherein R represents a divalent aliphatic hydrocarbon group having from 4 to 18 carbon atoms, a divalent cycloaliphatic hydrocarbon group having from 5 to 15 carbon atoms, or a divalent araliphatic hydrocarbon group having from 7 to 15 carbon atoms. Examples of the organic diisocyanates which are particularly suitable for this process include 1,4-tetramethylene diisocyanate, 1,6-hexa-methylene diisocyanate, 2,2,4-trimethyl-1,6-hexa-methylene diisocyanate, 1,12-dodecamethylene diisocyanate, cyclohexane-1,3- and -1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyantocyclohexyl)methane, 1,3- and 1,4-bis(isocyanatomethyl)-cyclohexane, bis-( 4-isocyanato-3-methyl-cyclohexyl)-methane, a,a,a',a'-tetramethyl-1,3- and/or -1,4-xylene diisocyanate, 1-isocyanato-1-methyl-4(3)-isocyanatomethyl cyclohexane, and 2,4- and/or 2,6-hexahydrotoluene diisocyanate. Mixtures of diisocyanates may also be used. Preferred diisocyanates are 1,6-hexamethylene diisocyanate, isophorone diisocyanate, and bis(4-isocyanatocyclohexyl)-methane. 1,6-Hexamethylene diisocyanate is especially preferred, either alone or as the primary constituent of a mixture of diisocyanates.

Examples of suitable triisocyanates that can be used as starting materials for preparing the polyisocyanates according to the present invention are organic triisocyanates represented by the formula:

R(NCO)3 wherein R represents an organic group obtained by removing the isocyanate groups from an organic triisocyanate having (cyclo)aliphatically bound isocyanate groups and a molecular weight of 112 to 1000, preferably 140 to 600. Examples of readily accessible triisocyanates include 1,8-diisocyanato-4-isocyanatomethyloctane (1,3,6-tris(isocyanato-methyl)-hexane), 1,2,3-tris(4'-isocyanato-1'-oxabutyl)propane and low molecular weight isocyanates prepared from amine derivatives of propoxylated glycerol and/or trimethylolpropane.

It is also possible in accordance with the present invention to use blends of the previously mentioned diisocyanates with monoisocyanates or polyisocyanates having three or more isocyanate groups, provided that the isocyanate groups are (cyclo)aliphatically bound.

In accordance with the present invention it is preferred to carry out the reaction under a blanket of an inert gas, such as nitrogen.

The dimerization and allophanatization catalysts may be any tertiary phosphines, for example the compounds mentioned in U.S. Pat. No. 4,614,785, column 4, lines 11–47, herein incorporated by reference. Tributyl phosphine and trioctyl phosphine are the preferred tertiary phosphine catalysts. Also suitable are peralkylated acid triamides such as those described by U.S. Pat. Nos. 3,290,288 and 4,614,785. A specific example would be tris(dimethylamino)phosphine.

Other suitable dimerization and allophanatization catalysts are 4-dialkylaminopyridines and 4-(N-arylalkyl-N-alkyl)aminopyridines. These catalysts have the structure Pyr-NR$_1$R$_2$ (I) where Pyr is a 4-pyridinyl residue and R$_1$ and R$_2$ are, independently from one another, C$_1$ to C$_6$ alkyl or C$_7$ to C$_{12}$ arylalkyl groups, or R$_1$ and R$_2$, taken together with the attached nitrogen, form a ring which may contain other heteroatoms, such as oxygen, nitrogen, or sulfur, to give, for example, pyrrolidine, piperidine, or morpholine residues. Common examples of 4-dialkylamino pyridines are 4-dimethylaminopyridine (referred to as DMAP), where structures R$_1$ and R$_2$ are both CH$_3$, and 4-pyrrolidinylpyridine, where structures R$_1$ and R$_2$, taken together, are (CH$_2$)$_4$. 4-(N-arylalkyl-N-alkyl)aminopyridines are exemplified by 4-(N-benzyl-N-methyl)aminopyridine (referred to as BMAP), where structure R$_1$ is CH$_2$C$_6$H$_5$ and R$_2$ is CH$_3$. Another class of useful dimerization and allophanatization catalysts are alkylated imidazoles such as 1,2-dimethylimidazole.

Polymer- or silica-bound versions of the above catalysts are also possible. These insoluble catalysts are preferable because no catalyst poison is needed and no catalyst residues of any kind are left in the product solution or the final purified product.

In the practical application of the processes according to this invention, the catalysts are generally used in a quantity of about 0.01% to 3% by weight, more preferably from 0.1% to 2% by weight, based upon the quantity of unmodified starting polyisocyanate.

Suitable poisons for the phosphine catalysts, which terminate not just the dimerization reaction of monoisocyanates and polyisocyanates, but also the allophanatization reaction of monoisocyanates and polyisocyanates, are those previously described for terminating the dimerization of monoisocyanates and polyisocyanates, e.g.: sulfur; oxidants such as oxygen, ozone, hydrogen peroxide, alkyl hydroperoxides, and alkyl peroxides; alkylating agents such as dimethyl sulfate, p-toluene sulphonic acid methyl ester; sulfonyl isocyanates of the type disclosed in U.S. Pat. No. 4,614,785, column 5, line 27 to column 6, line 35, herein incorporated by reference; or, halogen based acids of the form HX, where X is a halogen such as chlorine or bromine. The same catalyst poisons may be used with the amine catalysts, with the exception of sulfur and the oxidants. Low molecular weight catalysts or poisoned catalysts may also be removed by distillation from the product solution and/or the product.

The dimerization and allophanatization of the starting diisocyanates and polyisocyanates may be optionally carried out in the presence of solvents which are inert to isocyanate groups, alcohol groups, and the catalyst. Depending upon the area of application of the products according to this invention, low to medium boiling solvents or high boiling solvents may be used. Suitable solvents include dioxane; esters such as ethyl acetate or butyl acetate; aromatics, such as toluene or xylenes; ketones such as acetone, methyl ethyl ketone, or cyclohexanone; ethers, such as diisopropyl ether; alkanes such as cyclohexane, petroleum ether, or ligroin; and even chlorinated hydrocarbons, except for carbon tetrachloride.

In accordance with the present invention, allophanate groups are formed by reaction with uretidione groups by the use of linear, cyclic, or branched polyalcohols. Examples of suitable polyalcohols include ethanediol; 1,2- and 1,3-propanediol; 1,2- and 1,3-butanediol; 1,4- and 1,5-pentanediol; neopentyl glycol; 1,6- and 2,5-hexanediol; 3-methyl-pentane-1,5-diol, 2-methyl-2-propylpropane-1,3-diol, 2,2-diethylpropane-1,3-diol, 2-ethylhexane-1,3-diol, 2,2,4-trimethylpentane-1,3-diol, trimethylhexane-1,6-diol, 1,10-decanediol, 1,12-dodecanediol, diethylene glycol, triethylene glycol, dipropylene glycol, tripropylene glycol, 1,2,6-hexanetriol, trimethylolethane, trimethylolpropane, glycerine, pentaerythritol, 1,2- thru 1,4-cyclohexanediol. More preferable is the use of the ether-group containing polyalcohols. The use of higher functionality polyols will afford coating formulations with more rapid gelling, tack-free, and ultimate curing times compared to polyalcohols with lower functionalities.

The polyether polyalcohols useful in this invention have at least two hydroxyl groups and may, as an example, be prepared by the polymerization of ethylene oxide, propylene oxide, butylene oxide, or epichlorohydrin in the presence of a suitable polymerization catalyst, by their addition to starting components having reactive hydrogen atoms. Suitable starting components include ethylene glycol, 1,3- and 1,2-propylene glycol, trimethylolpropane, and glycerin. It is possible to use mixtures of the polymerizable groups and/or starting components.

When the polyisocyanates containing uretidione and allophanate groups according to this invention are prepared from polyalcohols or mixtures of polyalcohols where at least one component is a polyalcohol containing ethylene oxide units, the polyisocyanates can be easily dispersed in water.

Also suitable for the present invention are fatty alkyl polyalcohols or fluorinated polyalcohols, particularly where at least 2 contiguous carbons are fully fluorinated. Such polyalcohols will impart water or oil repellent characteristics to the final coating. Other products, such as RIM or cast elastomeric products, made from the products of this invention which incorporate fatty alkyl polyalcohols or fluorinated polyalcohols, particularly where at least 2 contiguous carbons are fully fluorinated, will derive similar benefits in addition to imparting the characteristics of an internal mold release agent.

Additionally, low molecular weight polyesters, polythioethers, polythioetheresters, polycarbonates, polylactones, polycaprolactones, polyacetals, and polysiloxanes may be used as the polyalcohols, either alone or as part of a polyalcohol mixture to impart desirable properties to the finished product.

Among the thioethers useful in this invention are the condensation products obtained by reacting thiodiglycol on its own and/or with other glycols, dicarboxylic acids, or formaldehyde. The products obtained are mixed ethers, polythio-ether-esters or polythio-ether-polyacetals, depending upon the coreactants.

Suitable polyhydroxy polyacetals include, for example, the compounds which can be prepared from glycols such as diethylene glycol, triethylene glycol, and hexanediol. Suitable polyacetals for the purpose of this invention may also be prepared by the polymerization of cyclic acetals.

The polycarbonates with more than one hydroxyl group are known and include those which can be prepared by the reaction of diols such as 1,3-propanediol, 1,4-butanediol, and/or 1,6-hexanediol, diethylene-glycol, triethyleneglycol, or tetraethyleneglycol with diarylcarbonates or carbonyldihalogens, such as phosgene.

Simple aliphatic alcohols, polyester alcohols, and polyether alcohols are preferred for the products and processes of this invention.

Polyalcohols containing functional groups not reactive with alcohol or isocyanate groups are also highly desirable. Examples would include polyalcohols containing acrylate, methacrylate, allyl, propenyl, acetyl, vinyl ether, norbornyl, cyanoacrylic, bismaleimide, and other polymerizable groups which would provide such added benefits as dual-, post- or pre-cure methods of coating hardening. Similar benefits could also be extended to other applications besides coatings, such as adhesives, sealants and RIM, and cast elastomers.

It is also possible in accordance with the present invention to use mixtures of the above polyalcohols to achieve the benefits described. It is also possible, and more preferable, in accordance with the present invention to use mixtures of the above polyalcohols to achieve the benefits described where at least one of the polyalcohols is an ether-group-containing polyalcohol.

The reaction temperature for uretidione and allophanate formation in accordance with the present invention is about 10° C. to 130° C., preferably about 40° C. to about 110° C., and most preferably between 55° C. and 95° C.

The process according to this invention may be carried out either batchwise or continuously, as described below. The starting polyisocyanate is introduced with the exclusion of moisture, and optionally under a pad of an inert gas, into a suitable stirred vessel or tube and optionally mixed with a solvent which is inert to isocyanate and alcohol groups, as well as, the active sites on the catalyst, such as toluene, butyl acetate, ethyl acetate, diisopropyl ether, or cyclohexane. The previously described polyalcohol, or polyalcohol mixture, may be introduced into the reaction vessel in accordance with several embodiments. More preferred is to add the polyalcohol, or mixture of polyalcohols, after the catalyst has been added and the dimerization reaction has commenced. It is preferable that the dimerization proceed to about 5 to 20% conversion, most preferably, about 10 to 15% conversion, before the alcohol is added.

The reaction is carried out until the desired degree of oligomerization has been achieved. The oligomerized portion of the starting polyisocyanate is herein defined as any polyisocyanate that is no longer a starting monomeric polyisocyanate as previously described. The termination is achieved by the addition of a catalyst poison or combination of poisons. This termination may be carried out at a degree of oligomerization of from 10% to 95% by weight, preferably at about 20% to 70% by weight. Virtually all of the alcohol groups are converted to at least monoallophanates or higher allophanates. The extent of reaction may be followed by IR measurement of the degree of dimerization and/or allophanatization. Thus, the reaction may be easily terminated at the desired degree of oligomerization, at the appropriate relative ratios of uretidione groups to allophanate groups. The quantity of catalyst poison required depends the quantity of dimerization catalyst that is used, as well as the efficiency of the catalyst poison. Generally, at least a stoichiometric quantity should be used.

After termination of the reaction, the major portion of unreacted excess starting polyisocyanate is removed by distillation in known manner and preferably reused for another reaction batch. Distillation may be carried out, for example, in vertical pipe evaporators or thin layer evaporators conventionally used for this purpose. The product obtained should generally contain a residue of monomeric starting polyisocyanate of less than 2% by weight, preferably less than 0.5% by weight.

The polyisocyanates according to this invention may also be prepared by blending polyisocyanates containing uretidione groups with polyisocyanates containing allophanate groups.

The modified polyisocyanates obtained in accordance with the process of the present invention, especially when 1,6-diisocyanatohexane is used as the starting polyisocyanate, have an isocyanate content of between 10% and 24% by weight, more preferably between 18% and 24% by weight. The ratio of monoallophanate groups to monouretidione groups is generally from 1:20 to about 5:1. Small amounts of carbamate may remain in the product, usually less than 0.5% by weight (as NH—CO—O), most preferably less than 0.1% by weight. The viscosity of these products at 25° C. is generally about 60 cp to about 1000 cp, more preferably between 60 cp and 300 cp.

The products according to this invention are valuable starting materials for the production of polyisocyanate polyaddition products by reaction with compounds containing at least two isocyanate reactive groups.

The products of the process according to this invention, in particular the preferred products according to this invention based on 1,6-diisocyanatohexane, are particularly valuable lacquer polyisocyanates. These products, optionally in the form of products blocked with reversible, monofunctional blocking agents for isocyanate groups, may be combined in known manner with organic polyhydroxyl compounds, in particular organic polyhydroxypolyesters, polyhydroxypolyethers, polyhydroxypolyacrylates, and optionally low molecular weight polyhydric alcohols known from polyurethanes coatings technology to form high quality two component polyurethane coating compositions. Polyamines, particularly in blocked form, for example, polyketimines, polyaldimines or oxazolidines, are also suitable reaction partners for the products according to the invention. Additionally, polyaspartic acid esters can be used as suitable reaction partners.

Additionally, these products, optionally in the form of products blocked with reversible, monofunctional blocking agents for isocyanate groups, may be combined in known manner with organic monohydroxyl compounds, in particular organic monohydroxypolyethers, to form high quality two component polyurethane coating compositions. The amounts of the polyisocyanates according to this invention and their reaction partners are selected to provide a ratio of isocyanate groups (whether blocked, internally blocked, or unblocked form) to isocyanate reactive groups of about 0.8 to 3, preferably about 0.9 to 1.1.

To accelerate hardening, the coating compositions may contain known polyurethane catalysts, e.g., tertiary amines such as triethylamine, pyridine, methyl pyridine, benzyl dimethylamine, N,N'-dimethylamino- cyclohexane, N-methylpiperidine, pentamethyl diethylene triamine, 1,4-diazabicyclo-2,2,2-octane, and N,N'dimethyl piperazine; or metal salts such as iron (III)-chloride, zinc chloride, zinc-2-ethyl caproate, tin(II)-ethyl caproate, dibutyltin(IV)-dilaurate, and molybdenum glycolate.

The products according to this invention are also valuable starting materials for two-component polyurethane stoving enamels in which the isocyanate groups are used in a form blocked by known blocking agents. The blocking reaction is carried out in known manner by reacting the isocyanate groups with suitable blocking agents, preferably at an elevated temperature (e.g., 40° C. to 160° C.), and optionally in the presence of a suitable catalyst, for example, the previously described tertiary amines or metal salts.

Suitable blocking agents include monophenols such as phenol, the cresols, the trimethylphenols, and the tertiary butyl phenols; tertiary alcohols such as tertiary butanol, tertiary amyl alcohol, and dimethylphenyl carbinol; compounds which easily form enols such as acetoacetic ester, acetyl acetone, and malonic acid derivatives, e.g., malonic acid diethylester; secondary aromatic amines, such as N-methyl aniline, the N-methyl toluidine, N-phenyl toluidine, and N-phenyl xylidine; imides such as succinimide; lactams, such as e-caprolactam and d-valerolactam; oximes such as butanone oxime and cyclohexanone oxime; mercaptans such as methyl mercaptan, ethyl mercaptan, butyl mercaptan, 2-mercaptobenzthiozole, a-napthyl mercaptan, and dodecyl mercaptan; triazoles such as 1H-1,2,4-triazole; and pyrazoles, such as dimethyl pyrazole.

The coating compositions may also contain other additives such as pigments, dyes, fillers, leveling agents, and solvents. The coating compositions may be applied to the substrate to be coated in solution or from the melt by conventional methods such as painting, rolling, pouring, or spraying.

The coating compositions containing the polyisocyanates according to this invention provide coatings which adhere surprisingly well to a metallic substrate, and are particularly light-fast, color stable in the presence of heat, and are very resistant to abrasion. Furthermore, they are characterized by high hardness, elasticity, very good resistance to chemicals, high gloss, excellent weather resistance, and good pigmenting properties. The polyisocyanates according to this invention also possess good compatibility with highly branched polyester resins.

The invention is further illustrated but is not intended to be limited by the following examples in which all parts and percentages are by weight unless otherwise specified.

EXAMPLES

EXAMPLE 1

To a 1000 ml 3-neck flask equipped with a gas bubbler, mechanical stirrer, thermometer, and condenser was added 500 grams of hexamethylene diisocyanate. The nitrogen flow, stirring and heating were started. When the temperature of the diisocyanate reached 75° C., 1.2 grams of tributyl phosphine was added and the dimerization was run at 75° C. When about 10% of the HDI had been converted to uretidione oligomers, 11 grams of diethylene glycol was added to the mixture and the reaction was continued. When the reaction mixture had reached a polyuretidione content of 20 wt %, the reaction was stopped by adding 1 molar equivalent (about 1.2 g) of methyl tosylate, followed by an additional 2 hours of heating at 85° C. The excess monomer was then removed by thin film evaporation to provide an almost colorless, clear liquid having a viscosity of 150 cp (25° C.), an NCO content of 20.8%, and a free HDI monomer content of 0.2%. The yield was 38%. By GPC, the average isocyanate functionality of the product was estimated to be 3.2.

EXAMPLES 2 TO 4 (According to this Invention)

Using the procedure described in Example 1, the following reactions were carried out using the specified reagents and conditions set forth in Table 1.

| Ex | Alcohol | PPH | Temp. (°C.) | % NCO | 25° C. Visc. (cp) | % Free HDI | Avg. NCO Funct'lity | Wt % Yield |
|---|---|---|---|---|---|---|---|---|
| 2 | Ethylene Glycol | 2.2 | 75 | 21.3 | 260 | 0.3 | 3.3 | 37 |
| 3 | Voranol* 234-630 | 2.2 | 92 | 21.3 | 150 | 0.4 | 3.6 | 37 |
| 4 | Glycerine | 2.2 | 92 | 20.9 | 700 | 0.3 | 5.0 | 37 |

*Voranol 234-630, a Dow Chemical Co. product, is an ethoxylated trimethytolpropane triol with an OH# of about 630 and an OH equivalent weight of about 89.

COMPARATIVE EXAMPLE A

Polyuretidione Product

The procedure of Example 1 was repeated, except that the polyalcohol (diethylene glycol) was not added to the reaction mixture. After removal of the excess monomer by thin film evaporation, there was obtained 110 grams of an almost colorless, clear liquid having a viscosity of 75 cp (25° C.), an NCO content of 21.5%, and a free HDI monomer content of 0.3% and an estimated average isocyanate functionality of 2.2.

COMPARATIVE EXAMPLE B

Polyisocyanurate Product

To a 1000 ml 3-neck flask equipped with a gas bubbler, mechanical stirrer, thermometer, and condenser was added 500 grams of hexamethylene diisocyanate. The nitrogen flow, stirring and heating were started. When temperature of the diisocyanate reached 80° C., 0.2 grams of a 10% solution of benzyltrimethyl ammonium hydroxide in butanol was added and the trimerization was run at 80° C. When the reaction mixture had reached a polyisocyanurate content of 30 wt %, the reaction was stopped by adding 1 molar equivalent of HCl (5% in HDI). The excess monomer was then removed by thin film evaporation to provide an almost colorless, clear liquid having a viscosity of 2800 cp (25° C.), an NCO content of 21.4%, and a free HDI monomer content of 0.2% with an estimated average isocyanate functionality of 3.5.

APPLICATION EXAMPLES

Four polyuretidione-allophanates were evaluated in comparison to a simple uretidione polyisocyanate prepared in the Comparative Example A.

A solvent Mixture C was prepared from equimass amounts of butyl acetate, methyl amyl acetate, and ethyl ethoxy propionate.

An isocyanate reactive coformulation B was prepared based upon the ingredients outlined below in Table 2.

TABLE 2

| INGREDIENT | WEIGHT (grams) |
|---|---|
| Joncryl J-510[a] | 50.00 |
| G-Cure 105P70[b] | 50.00 |
| FC430 (10% in toluene)[c] | 0.34 |
| T-12 (1% in toluene)[d] | 1.50 |

[a]Acrylic resin from S. C. Johnson
[b]Acrylic resin from Henkel, GA
[c]Flow aid from 3M in toluene?
[d]Dibutyltindilaurate The G-Cure 105P70 is an acrylic polyol, obtained and used as a 70 wt % solution in propylene glycol monomethyl ether acetate with an equivalent weight of 815. and an OH number of 68.8. Joncryl J-510 is a pure acrylic polyol with an equivalent weight of 500 and an OH number of 143. To form the coatings, sufficient polyisocyanate was added to the isocyanate reactive formulation to provide a ratio of isocyanate groups to hydroxyl groups of about 1.0 to 1.1. The drying profiles and physical development of the films and pot lives of the fully combined formulations are noted in Table 3.

TABLE 3

| | Ex. A | Ex. 1 | Ex. 2 | Ex. 3 | Ex. 4 |
|---|---|---|---|---|---|
| Isocyanate Coformulation: pbw of polyisocyanate | | | | | |
| per 100 pbw Cofrmn. B (grams) | 32.1 | 35.8 | 35.0 | 35.0 | 35.7 |
| Solvent Mix C (grams) | 49.0 | 52.0 | 55.0 | 51.0 | 60.0 |
| VOC (lbs/gallon) | 3.7 | 3.7 | 3.8 | 3.7 | 3.9 |
| Film Development: | | | | | |
| Solvent Evap. Times (hrs) | 0.9 | 0.8 | 0.7 | 0.7 | 0.4 |
| Gelation Times (hrs) | 1.9 | 1.7 | 1.5 | 1.3 | 1.1 |
| Hard Dry Times (hrs) | 1.7 | 1.7 | 1.3 | 1.7 | 1.4 |
| Total Dry Times (hrs) | 4.5 | 4.2 | 3.5 | 3.7 | 2.9 |
| Pot life: | | | | | |
| T = 0 | 21.7 | 22.3 | 22.2 | 21.8 | 21.5 |
| T = 1.0 hrs | 26.3 | 26.2 | 26.5 | 25.7 | 25.9 |
| T = 2.5 hrs | 33.2 | 32.3 | 33.5 | 35.2 | 38.5 |
| Estimated Pot Life (hrs) | 2.50 | 2.70 | 2.50 | 2.00 | 1.50 |
| Film Properties: | | | | | |
| 20° Gloss | 100 | 98 | 98 | 97 | 97 |
| 60° Gloss | 114 | 112 | 112 | 112 | 112 |
| Pencil Hardness | 3.0 | 3.0 | 3.0 | 4.0+ | 4.0+ |
| Impact Resistance: | | | | | |
| Forward | 160+ | 160+ | 160+ | 160+ | 160+ |
| Reverse | 160+ | 160+ | 160+ | 160+ | 160+ |
| Mandrel | pass | pass | pass | pass | pass |
| Adhesion | pass | pass | pass | pass | pass |
| DOI | 90–100 | 90–100 | 90–100 | 90–100 | 90–100 |
| Chemical and Environmental Resistance (30 minute spot test) | | | | | |
| MEK | M | M | M | M | M |
| Xylenes | M | M | M | M | M |
| 10% Acetic Acid | pass | pass | pass | pass | pass |
| 10% HCl | pass | pass | pass | pass | pass |
| 10% NaOH | pass | pass | pass | pass | pass |

Several improvements attributable to the use of the products of this invention are observed. Comparing their performance to the uretidione-isocyanurate (of Comparative Example A) formulation, there is an overall reduction in coating gel and hard dry times, particularly as functionality of the uretidione-allophanate increases. Gel times are a measure of the time required for the coating to vitrify and no longer flow. Gel times correlate well with tack-free times, or that time when dust and particulate matter will not readily stick to the coating. Hard dry times measure the point when a maximum hardness value is achieved. Therefore, when the products of the current invention are used, shorter total coating times result, which, in turn, permits a larger number of parts to be coated per unit time, resulting in a reduction in overall manufacturing costs. Significant reductions in manufacturing cycle times are a major benefit, particularly in the automotive refinish markets where dust free storage space is expensive and is therefore a production limiting criteria. In addition, the ultimate hardness of the coatings utilizing the trifunctional polyol-based allophanates were higher than that of the uretidione-isocyanurate polyisocyanate formulation. Higher hardness indicates improved scratch and marring resistance. The benefit of higher hardness is improved coating performance as well as fewer defects related to part handling. All of the other physical properties are as expected for a polyurethane coating.

A second set of application tests were carried out using an oxazolidine as a reactive diluent. The four polyuretidione-allophanates were compared to the simple uretidione polyisocyanate (prepared in Comparative Example A) and a polyisocyanurate polyisocyanate (prepared in Comparative Example B).

A solvent Mixture C was prepared from equimass amounts of butyl acetate, methyl amyl acetate, and ethyl ethoxy propionate.

An isocyanate reactive coformulation B was prepared based upon the ingredients outlined below in Table 4.

TABLE 4

| INGREDIENT | WEIGHT (grams) |
|---|---|
| G-Cure 105P70[a] | 86.00 |
| QM1007[b] | 14.00 |
| FC430 (10% in toluene)[c] | 0.34 |
| T-12 (1% in toluene)[d] | 1.50 |

[a] Acrylic resin from Henkel GA
[b] Difunctional oxazoladine from Rohm & Haas
[c] Flow aid from 3M in toluene
[d] Dibutyltindilaurate The G-Cure 105P70 is an acrylic polyol, obtained and used as a 70 wt % solution in propylene glycol monomethyl ether acetate with an equivalent weight of 815 and an OH number of 68.8. To form the coatings, sufficient polyisocyanate was added to the isocyanate reactive formulation to provide a ratio of isocyanate groups to hydroxyl groups of about 1.0 to 1.1. The drying profiles and physical development of the films and pot lives of the fully combined formulations are noted in Table 5.

TABLE 5

|  | Ex. A | Ex. B | Ex. 1 | Ex. 2 | Ex. 3 | Ex. 4 |
|---|---|---|---|---|---|---|
| Isocyanate Coformulation: pbw of polyisocyanate |  |  |  |  |  |  |
| per 100 pbw Cofrmn. B (grams) | 44.5 | 53.2 | 49.7 | 48.5 | 48.5 | 49.4 |
| Solvent Mix C (grams) | 49.0 | 68.0 | 50.0 | 54.0 | 51.0 | 59.0 |
| VOC (lbs/gallon) | 3.6 | 3.8 | 3.5 | 3.5 | 3.5 | 3.7 |
| Film Development: |  |  |  |  |  |  |
| Solvent Evap. Times (hrs) | 0.4 | 0.4 | 0.5 | 0.2 | 0.5 | 0.2 |
| Gelation Times (hrs) | 1.4 | 1.3 | 1.4 | 1.2 | 0.9 | 0.7 |
| Hard Dry Times (hrs) | 1.7 | 1.0 | 1.4 | 1.9 | 2.0 | 2.3 |
| Total Dry Times (hrs) | 3.5 | 2.7 | 3.3 | 3.3 | 3.4 | 3.2 |
| Pot Life: |  |  |  |  |  |  |
| T = 0 | 20.8 | 21.2 | 22.3 | 22.3 | 22.2 | 22.1 |
| T = 1.5 hrs | 25.2 | 31.3 | 28.0 | 30.1 | 28.9 | 29.2 |
| T = 2.5 hrs | 36.0 | 47.8 | 42.0 | 44.6 | 40.9 | 41.0 |
| Estimated Pot Life (hrs) | 2.25 | 1.50 | 2.00 | 1.75 | 2.00 | 2.00 |
| Film Properties: |  |  |  |  |  |  |
| 20° Gloss | 99 | 96 | 97 | 98 | 98 | 98 |
| 60° Gloss | 112 | 109 | 111 | 111 | 112 | 112 |
| Pencil Hardness | 3.5 | 4.0 | 3.5 | 3.5 | 3.5 | 4.0 |
| Impact Resistance: |  |  |  |  |  |  |
| Forward | 160+ | 160+ | 160+ | 160+ | 160+ | 160+ |
| Reverse | 160+ | 160+ | 160+ | 160+ | 160+ | 160+ |
| Mandrel | pass | pass | pass | pass | pass | pass |
| Adhesion | pass | pass | pass | pass | pass | pass |
| DOI | 90–100 | 90–100 | 90–100 | 90–100 | 90–100 | 90–100 |
| Chemical and Environmental Resistance (30 minute spot test) | | | | | | |
| MEK | M | SM | M | M | M | SM |
| Xylenes | M | M | M | M | M | SM |
| 10% Acetic Acid | pass | pass | pass | pass | pass | pass |
| 10% HCl | pass | pass | pass | pass | pass | pass |
| 10% NaOH | pass | pass | pass | pass | pass | pass |

The improvements for these formulations were similar to the previous set. Most significantly, the gel times are faster for the uretidione allophanates versus the uretidione-isocyanurate formulations, particularly as functionality increases.

Specifically, the gel times for the trifunctional polyol-based allophanates were 40 to 50% less than that of the uretidione-isocyanurate polyisocyanate formulation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid, monoallophanate-containing, monouretidione-containing polyisocyanate composition characterized by:

i) an isocyanate functionality of between 2.8 and 6.5, ii) an NCO content of 10% to 47% by weight, iii) a viscosity of less than 1000 cp (25° C.), and iv) the presence of monouretidione and monoallophanate groups in a molar ratio of said monouretidione groups to said monoallophanate groups of between about 20:1 and about 1:5, said allophanate groups being a reaction product of uretidione or isocyanate groups and a polyalcohol or a polyalcohol mixture, each molecule of said polyalcohol and said polyalcohol mixture containing between 2 and 20 carbon atoms and having a molecular weight of between 62 and about 2500, said monoallophanate-containing, monouretidione-containing polyisocyanate composition also containing: (a) no greater than 0.5% of urethane groups (as NH—CO—O) based upon the weight of the polyisocyanate composition, (b) a total amount of incorporated polyalcohol of between about 2% and about 22% based upon the weight of the polyisocyanate composition, and (c) an amount of monoallophanate compounds of between about 10% and about 70% based upon the weight of the polyisocyanate composition.

2. The composition of claim 1 wherein the total amount of incorporated polyalcohol is between 4% and 16% based upon the weight of the polyisocyanate composition.

3. The composition of claim 1 wherein said composition is free of organic solvent and free of peroxide.

4. The composition of claim 1 which contains urethane groups in a ratio of monoallophanate groups to urethane groups of greater than about 5:1.

5. A process for the preparation of a liquid, monoallophanate-containing, monouretidione-containing polyisocyanate composition mixture characterized by:

i) an isocyanate functionality of between 2.8 and 6.5, ii) an NCO content of 10% to 47% by weight, iii) a viscosity of less than 1000 cp (25° C.), and iv) the presence of monouretidione and monoallophanate groups in a molar ratio of said monouretidione groups to said monoallophanate groups of between about 20:1 and about 1:5, said allophanate groups being a reaction product of uretidione or isocyanate groups and a polyalcohol or a polyalcohol mixture, each molecule of said polyalcohol and said polyalcohol mixture containing between 2 and 20 carbon atoms, between 2 and 10 alcohol groups, and having a molecular weight of between 62 and about 2500, said polyisocyanate composition containing: (a) no greater than 0.5% of urethane groups (as NH—CO—O) based upon the weight of the polyisocyanate composition, (b) a total amount of incorporated polyalcohol of between about 2% and about 22% based upon the weight of the polyisocyanate composition, and (c) an amount of monoallophanate groups of between about 10% and about 70% based upon the weight of the polyisocyanate composition, said process comprising the steps of:

A) dimerizing a portion of the isocyanate groups of an organic polyisocyanate, or organic polyisocyanate mixture, having aliphatic or cycloaliphatically bound isocyanate groups, to form a uretidione-containing composition, B) contacting said polyalcohol, or said polyalcohol mixture, with said uretidione-containing composition, in an amount of between about 0.01 and about 0.5 moles of polyalcohol or polyalcohol mixture, per mole of organic isocyanate groups in the uretidione-containing composition, upon initiation of, or during, step A) recited above, and causing said polyalcohol or said polyalcohol mixture to react with said uretidione-containing composition, thereby forming said monoallophanate-containing, monouretidione-containing polyisocyanate composition, and C) terminating the dimerization and allophanate-forming reactions, by adding a catalyst poison to the monoallophanate-containing, monouretidione-containing polyisocyanate composition, upon forming a desired amount of said monoallophanate and said monouretidione in said polyisocyanate composition.

6. The process of claim 5 wherein the total amount of polyalcohol incorporated in said composition is between 4% and 16% based upon the weight of the polyisocyanate composition.

7. The process of claim 5 wherein said composition is free of organic solvent and free of peroxide.

8. The process of claim 5 wherein said composition contains urethane groups in a ratio of monoallophanate groups to urethane groups of greater than about 5:1.

9. A coating composition comprising:

(A) an active hydrogen-containing component, and (B) a liquid, monoallophanate-containing, monouretidione-containing polyisocyanate composition characterized by:

i) an isocyanate functionality of between 2.8 and 6.5, ii) a free NCO content of 10% to 47% by weight, iii) a viscosity of less than 1000 cp (25° C.), and iv) the presence of monouretidione and monoallophanate groups in a molar ratio of said monouretidione groups to said monoallophanate groups of between about 20:1 and about 1:5, said allophanate groups being a reaction product of uretidione or isocyanate groups and a polyalcohol or a polyalcohol mixture, each molecule of said polyalcohol and said polyalcohol mixture containing between 2 and 20 carbon atoms and having a molecular weight of between 62 and about 2500, said monoallophanate-containing, monouretidione-containing polyisocyanate composition also containing: (a) no greater than 0.5% of urethane groups (as NH—CO—O) based upon the weight of the polyisocyanate composition, (b) a total amount of incorporated polyalcohol of between about 2% and about 22% based upon the weight of the polyisocyanate composition, and (c) an amount of monoallophanate groups of between about 10% and about 70% based upon the weight of the polyisocyanate composition.

10. The coating composition of claim 9 wherein the total amount of polyalcohol incorporated in said polyisocyanate composition is between 4% and 16% based upon the weight of the polyisocyanate composition.

11. The coating composition of claim 9 wherein said polyisocyanate composition is free of organic solvent and free of peroxide.

12. The coating composition of claim 9 wherein said polyisocyanate composition contains urethane groups in a ratio of monoallophanate groups to urethane groups of greater than about 5:1.

13. The coating composition of claim 9 wherein at least some of the isocyanate groups on said polyisocyanate composition are blocked with a blocking agent.

14. A method of coating a substrate which comprises contacting the substrate with the coating composition of claim 9.

* * * * *